219-121

2/14/84 OR 4,431,901

United States Patent [19]

Hull

[11] 4,431,901

[45] Feb. 14, 1984

[54] INDUCTION PLASMA TUBE

[75] Inventor: Donald E. Hull, Los Alamos, N. Mex.

[73] Assignee: The United States of America as represented by the United States Department of Energy, Washington, D.C.

[21] Appl. No.: 394,559

[22] Filed: Jul. 2, 1982

[51] Int. Cl.$^{3}$ .............................................. B23K 5/00

[52] U.S. Cl. ...................... 219/121 PR; 219/121 PN; 219/10.57; 219/10.65; 219/10.49 R

[58] Field of Search ...... 219/121 P, 121 PN, 121 PR, 219/76.1, 10.57, 10.65, 10.49; 373/156

[56] References Cited

U.S. PATENT DOCUMENTS

| | | | |
|---|---|---|---|
| 3,641,308 | 2/1972 | Couch, Jr. et al. | 219/121 PR |
| 3,944,778 | 3/1976 | Bykhovsky et al. | 219/121 PR |
| 4,247,736 | 1/1981 | Grigorier et al. | 219/10.49 R |

OTHER PUBLICATIONS

"Induction Plasma Heating: System Performance, Hydrogen Operation and Gas Core Reactor Simulator Development," Thorpe, M. L.; NASA CR-1143 Aug. 1968.

"Induction Plasma Heater with High Velocity Sheath", TAFA Bulletin 26-D8; Jul. 1968.

"Induction-Coupled Plasma as a Chemical Reactor", Clump, C. L.; Huska, P. A.; Lehigh University; H-F Heating Review.

"Induction-Coupled Plasma Torch"; Reed, T. B.; MIT; High Frequency Heating Review, New York, N.Y.

*Primary Examiner*—Roy N. Envall, Jr.
*Assistant Examiner*—M. M. Lateef
*Attorney, Agent, or Firm*—William A. Eklund; Paul D. Gaetjens

[57] ABSTRACT

An induction plasma tube having a segmented, fluid-cooled internal radiation shield is disclosed. The individual segments are thick in cross-section such that the shield occupies a substantial fraction of the internal volume of the plasma enclosure, resulting in improved performance and higher sustainable plasma temperatures. The individual segments of the shield are preferably cooled by means of a counterflow fluid cooling system wherein each segment includes a central bore and a fluid supply tube extending into the bore. The counterflow cooling system results in improved cooling of the individual segments and also permits use of relatively larger shield segments which permit improved electromagnetic coupling between the induction coil and a plasma located inside the shield. Four embodiments of the invention, each having particular advantages, are disclosed.

5 Claims, 8 Drawing Figures

INDUCTION PLASMA TUBE

This invention is the result of a contract with the Department of Energy (Contract No. W-7405-ENG-36).

BACKGROUND OF THE INVENTION

The invention disclosed herein is generally related to high frequency induction plasma tubes and, more specifically, to induction plasma tubes having internal radiation shields.

High frequency induction plasma tubes are well-known for producing high temperature gaseous plasmas. Such plasmas are useful in a number of practical applications, including high temperature spectroscopic studies and the preparation of microcrystalline refractory materials.

An induction plasma tube consists essentially of an electrical induction coil surrounding an enclosure which contains an ionizable gas. The coil is connected to a source of high frequency (400 kHz to 5 mHz) electrical current. The enclosure typically consists of a quartz tube centered inside the coil. Argon is a commonly used ionizable gas. Upon application of power to the induction coil the gas is ionized, producing a central core of hot gaseous plasma inside the enclosure.

At low power levels the plasma is concentrated toward the center of the enclosure such that there is no danger of heat damage to the enclosure walls. At high power levels, however, the plasma core is both hotter and larger in diameter. As a result, the quartz enclosure is easily damaged by the plasma, which typically attains temperatures on the order of 10,000° C. and above. This problem is aggravated by the fact that the plasma is typically subject to magnetic and electric instabilities that cause it to fluctuate in position and occasionally contact the enclosure walls. High power levels also result in the emission of intense ultraviolet radiation from the plasma, which ionizes the air around the enclosure and results in electrical arcing in the induction coil. These adverse effects have lead to the use of internal water-cooled radiation shields, located inside the enclosure, to protect the enclosure walls and block emission of ultraviolet radiation from the plasma core. Such shields are commonly used in addition to other protective cooling measures, for example the use of double-walled water-cooled enclosures and the use of a continuously flowing stream of coolant gas along the inside surface of the enclosure.

The previously known internal shields are tubular in shape, thin-walled, and are sized slightly smaller in diameter than the tubular quartz enclosure so as to fit closely inside the enclosure and surround the plasma core. Such shields have typically been formed of thin copper tubing through which coolant water is pumped. For example, one prior art shield consists of multiple hairpin-shaped coolant tubes which extend axially into the quartz enclosure from a manifold. Water is pumped from the manifold down one side of each tube and returns upwardly through the other side to a water return duct in the manifold. One disadvantage of this design is that the return side of each tube is always warmer than the supply side, since the coolant water is progressively warmed as it travels through the tube. As a result of this uneven cooling and the thin-walled construction, the shield is easily damaged by the plasma and does not adequately protect the enclosure walls.

The radiation shield must function as a barrier to a substantial portion of the heat and radiation emitted from the plasma, yet at the same time it must be transparent to the electric and magnetic fields produced by the coil. The latter requirement has previously been assumed to have been met, according to considerations based on conventional electromagnetic theory of induction plasma tubes, by making the shield as thin as possible and by utilizing a segmented construction. For example, the above-mentioned prior art shield is formed of thin-walled, small diameter copper tubing, with the individual coolant tubes being spaced circumferentially from one another. As discussed further below, it has now been found that this assumption is incorrect, and that there are in fact advantages to using a thick-walled, segmented construction.

With a prior art shield of the type described above, maximum attainable plasma temperatures have been limited to approximately 18,000° C. However, such temperatures have only been attainable by maintaining a relatively high flow rate of gas through the enclosure to assist in cooling the shield and the enclosure. The turbulence resulting from this gas flow has several disadvantages. For example, in the preparation of microcrystalline refractory materials such turbulence results in a less uniform particle size distribution, and in spectroscopic studies it results in broadened peaks and spurious signals. Additionally, turbulence contributes to instability in the plasma arc itself, which frequently makes it difficult to initiate and sustain the plasma over a period of time.

SUMMARY OF THE INVENTION

Accordingly, it is an object and purpose of the present invention to provide an improved high frequency induction plasma tube. More particularly, it is an object of the invention to provide an induction plasma tube having an improved internal radiation shield which permits attainment of sustained temperatures of approximately 18,000° C.

It is also an object of the present invention to provide an induction plasma tube in which high plasma temperatures can be obtained at low or negligible gas flow rates.

It is another object to produce an induction plasma tube in which a stable plasma can be maintained, particularly in gases at atmospheric pressure.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as embodied and broadly described herein, the induction plasma tube of the present invention comprises an electrical induction coil, a tubular enclosure centered in the induction coil, and a segmented radiation shield located inside the enclosure. The radiation shield consists of a plurality of elongate, fluid-cooled shield segments. The segments extend parallel to one another as well as the common axis of the coil and enclosure, and are arranged in a circular configuration so that the shield is generally tubular in configuration. In contrast with prior art shields, the shield of the present invention consists of relatively fewer segments, for example twelve, each of which is relatively large in cross-section, such that the shield occupies a substantial fraction of the internal volume of the enclosure. The segments of the shield are, however, spaced apart circumferentially to permit penetration of the electrical field of the induction coil into the central cavity where the plasma is generated. It has been found that, contrary to expectations, such a shield permits attainment of sustained plasma temperatures several thousand degrees higher than have previously been reported. Moreover, such temperatures are sustainable in a stationary gas at atmospheric pressure, resulting in a particularly stable plasma arc that is of improved utility in spectroscopic studies and high temperature synthesis of refractory materials.

In the preferred embodiment, the individual segments of the shield are each cooled by means of a counterflow cooling system. In accordance with this system the shield segments are connected to a coolant manifold having coolant supply and exhaust ducts. Each segment includes a central longitudinal bore which opens into the exhaust duct of the manifold and which is closed at its opposite end. A fluid supply tube extends into the bore from the supply duct of the manifold and terminates at an open end adjacent the closed end of the bore. During operation, coolant fluid is pumped from the manifold into the shield segment through the supply tube, returning to the exhaust duct of the manifold through the bore along the outside of the supply tube. This arrangement results in relatively uniform cooling of the shield segment along its entire length, and also results in all of the segments being cooled uniformly and thereby maintained at approximately the same temperature. This is in contrast with previously known plasma tube shields, particularly those consisting of thin copper tubes bent into hairpin configurations, wherein one side of each shield segment is always warmer than the other side due to progressive heating of the coolant fluid as it travels through the segment. Additionally, the heavier construction of the shield segments results in decreased susceptibility to heat damage from the plasma arc.

Another advantage of the counterflow cooling system is that each shield segment is free standing at its end opposite the manifold, unlike the previously known shield designs wherein each shield segment terminates at a U-shaped hairpin turn. This aspect of the invention is important in certain chemical applications wherein a continuous stream of an ionizable carrier gas is passed axially through the plasma tube, and wherein gaseous reagents injected into the stream react to form fine-grained particulate materials. In such processes, it is desirable that the gas flow be smooth and nonturbulent in order to obtain uniform reaction rates and a controlled particle size distribution. It is also desirable that the radiation shield have no surfaces which can collect powdered material or impair the flow of the gas. This is accomplished with the shield of the present invention by directing the gas flow through the tube away from the coolant manifold, such that the finger-like segments extend in the direction of gas flow and thereby do not collect any powdered material or impair the flow of gas.

Another consequence of the counterflow cooling system described above is that the finger-like segments are necessarily thicker than elements of previously known plasma shields. According to conventional theory of electromagnetic induction, the shield elements should be made as thin as possible in order to maintain effective electrical coupling between the induction coil and the ionizable gas in the plasma tube. However, the applicant has discovered that, contrary to expectations based on previously accepted theory, the electrical performance of the plasma tube is in fact not diminished by using the thicker shield segments described above. This is believed to be due to electrical eddy currents which are produced in the shield segments and which electrically couple the plasma to the coil. In any event, however, not only can higher temperatures on the order of 18,000° C. be obtained routinely, but such temperatures can be maintained in a stationary volume of gas, i.e., a gas which is not flowing through the plasma tube, all without incurring damage to either the shield or the quartz enclosure. One practical result of this improved performance is that chemical processes involving the synthesis of refractory powders in a plasma can now be conducted at higher temperatures and, at the same time, in a less turbulent plasma atmosphere.

The applicant has further discovered that the cross-sectional shape of the shield segments can be varied to obtain specific performance characteristics. In this regard, it is noted above that electrical arcing in the induction coil has previously placed a limitation on the maximum power level that may be applied to a plasma tube. As also noted above, such arcing is caused by ionization of the air around the windings, which ionization is induced by ultraviolet radiation from the plasma. This problem is aggravated by the fact that the plasma tube enclosure is ordinarily made of quartz, which is used because it is relatively refractory, but which is also relatively transparent to ultraviolet radiation. Even the relatively small amount of ultraviolet radiation that is emitted through the gaps between the shield segments may be sufficient to induce arcing. Although one apparently obvious solution to the arcing problem would be to remove or partially occlude the gaps between the shield segments altogether, it is also known that such gaps must be maintained to permit electrical coupling between the induction coil and the plasma.

It has been found that this problem can be mitigated by using shield segments which overlap so as to block direct emission of radiation through the shield. For example, in one embodiment the shield segments are chevron-shaped in cross section. This results in an interlocking arrangement between adjacent segments which maintains the gap between adjacent segments and yet which also blocks direct transmission of ultraviolet radiation through the gap between the segments. This configuration also has the surprising and unexpected result that the diameter of the plasma arc decreases as the power level to the induction coil is increased. Because of this effect, this embodiment has found particular application in the formation of fine-grained refractory powders by a chemical plasma process, since the plasma can be kept away from the shield segments at high power levels.

In another embodiment of the invention, which is also directed to the problem of arcing, the individual shield segments have a cross-sectional shape which is that of a truncated wedge, with the truncated point of the wedge directed toward the center of the plasma tube. In one version of this embodiment, a refractory dielectric material is positioned between the opposing surfaces of each pair of adjacent segments. For example, the segments may be provided with opposing concave grooves in which is positioned a cylinder of such a refractory dielectric material, for example boron nitride. The gaps between adjacent shield segments are oriented radially with respect to the plasma tube, and thus would transmit ultraviolet radiation but for the presence of the refractory dielectric material interposed in the gap between each pair of segments. The refractory material allows electrical coupling between the induction coil and the plasma, yet blocks a major portion of the ultraviolet radiation emitted from the plasma. By positioning refractory rods in opposing concave grooves as just described, adequate heat conduction from the rods to the adjacent fluid-cooled metal segments is maintained to prevent heat damage to the rods.

These and other aspects of the applicants invention are more fully set forth in the following detailed description of the preferred embodiments and in the accompanying drawings.

DETAILED DESCRIPTION OF THE INVENTION

Figure 1:
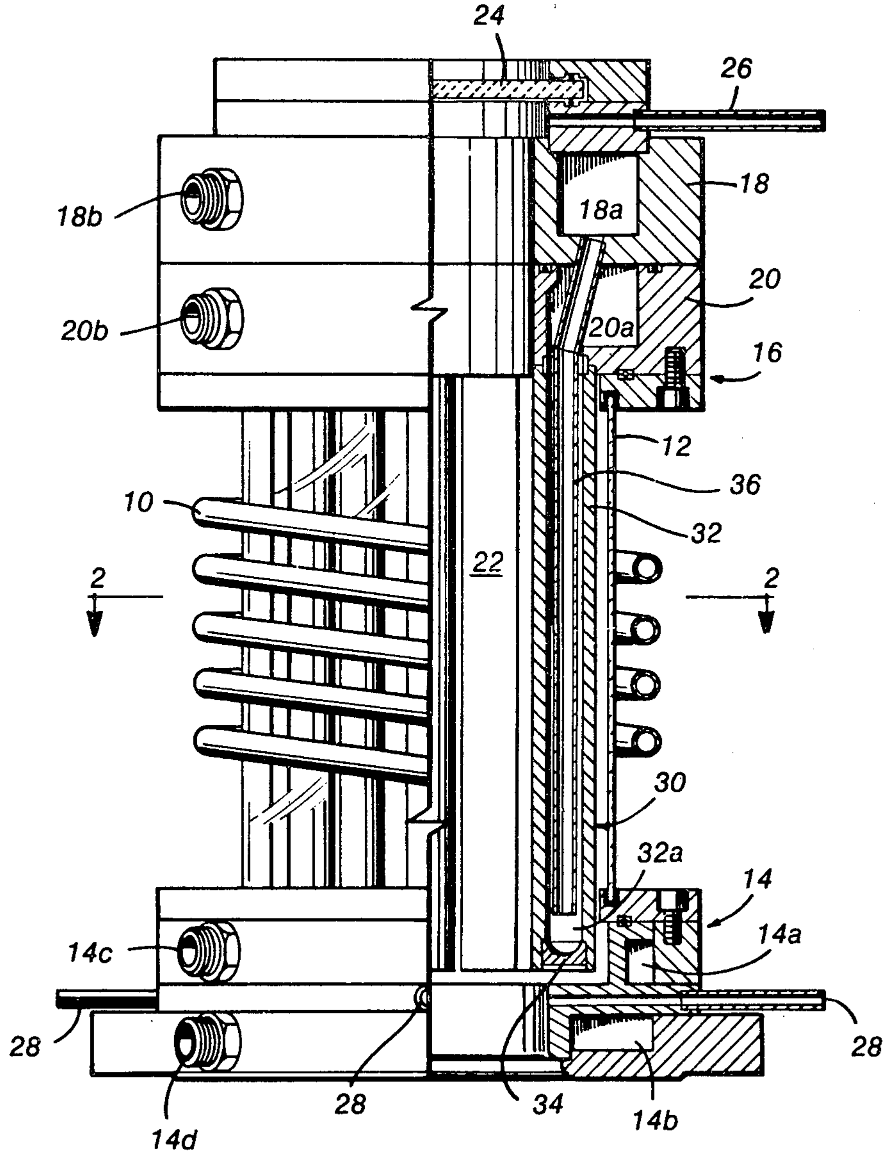
FIG. 1 is a side elevation view in partial cross-section of a first embodiment of the induction plasma tube of the present invention.

FIGS. 1 through 8 illustrate four embodiments of the invention. The first embodiment, shown in FIGS. 1 and 2, generally includes a water-cooled copper induction coil 10 which surrounds a tubular quartz enclosure 12. The enclosure 12 extends upwardly from a water-cooled base 14 to an upper assembly 16 which includes a water supply manifold 18 and a water exhaust manifold 20. The supply and exhaust manifolds 18 and 20 include annular interior water channels **18*a* and 20*a*, which are connected to exterior supply and exhaust water fittings 18*b* and 20*b*, respectively. Likewise, the base 14 includes annular interior water cooling channels 14*a* and 14*b* which are connected to one another and which are connected to exterior water supply and exhaust fittings 14*c* and 14*d*, respectively. The base 14 and the manifolds 18 and 20 are all annular so as to define a central cylindrical cavity 22 wherein a plasma may be formed by application of a high frequency electrical current to the induction coil 10. A quartz window 24 is mounted on top of the upper assembly 16 for viewing the plasma formed in the central cavity 22**.

The plasma tube further includes a plasma gas intake tube 26 at the top of the upper assembly 16. The intake tube 26 is used to admit an ionizable gas such as argon into the cavity 22, and for maintaining a flow of such a gas downwardly through the tube. The intake tube 26 may also be used to introduce various gaseous reactants into the cavity 22. The plasma tube further includes a set of four process gas intake tubes 28 which open into the lower end of the cavity 22 from the base 14. These tubes 28 are used when it is desired to introduce gaseous reactants into the plasma arc downstream from the induction coil 10.

Figure 2:
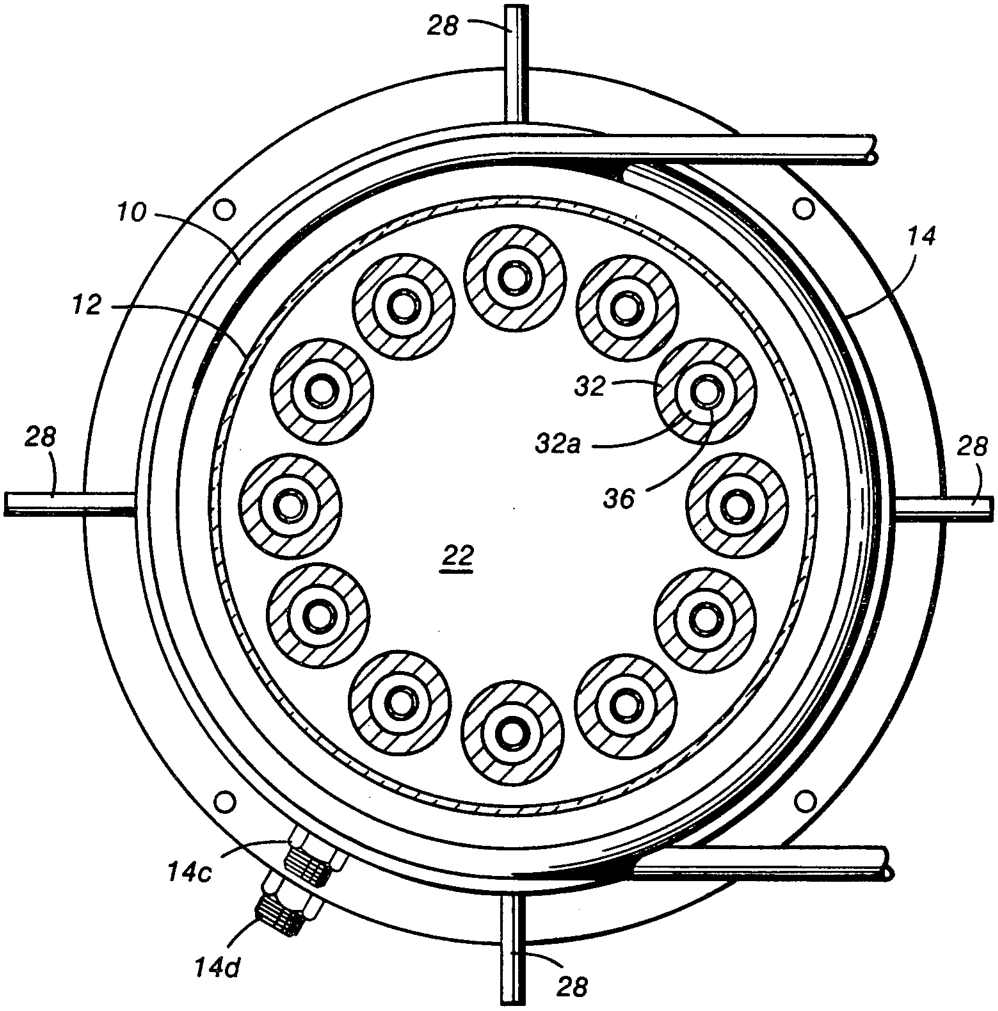
FIG. 2 is a plan view in cross-section of the embodiment illustrated in FIG. 1, taken along section line 2—2 of FIG. 1.

The plasma tube of FIGS. 1 and 2 further includes a segmented shield 30 which consists of twelve substantially identical thick-walled copper tubes 32. The tubes 32 are affixed at their upper ends to the water exhaust manifold 20 and extend downwardly therefrom along the inside surface of the tubular quartz enclosure 12. The tubes 32 are parallel to one another and are equally spaced from one another so as to form a generally tubular, segmented shield which protects the quartz enclosure 12 from most of the heat and radiation emitted from a plasma located centrally in the cavity 22. The shield also reduces the amount of ionizing ultraviolet radiation emitted to the induction coil 10, thereby preventing electrical arcing between the windings of the coil 10.

Each tube 32 includes a central longitudinal bore **32*a* which is in communication with the water exhaust channel 20*a* of manifold 20. Each bore 32*a* is closed at its lower end by means of a plug 34** having a concave upper surface.

Each tube 32 further includes a water supply tube 36 which extends from the water supply channel **18*a* of the supply manifold 18 into the bore 32*a* of the respective tube 32. Each water supply tube 36 extends almost the entire length of its respective shield tube 32, terminating at an open end adjacent the end plug 34 of the tube 32. In operation, water is continuously pumped from the supply manifold 18 downwardly through the supply tubes 36 and thence upwardly through the bores 32*a* along the outsides of the supply tubes 36 to the water exhaust manifold 20. In this manner, each tube 32 of the shield 30 is independently and continuously cooled. Moreover, this counterflow cooling system results in each tube 32** being cooled relatively uniformly along its entire length.

To indicate the size of the plasma tube of FIGS. 1 and 2, it is noted that FIG. 2 is drawn approximately to full scale and FIG. 1 is approximately one-half scale. The plasma tube is typically operated at a frequency of 400 kHz to 5 mHz, at a power level of approximately 20 kW applied to the induction coil. Under such conditions, a stationary (non-flowing) argon plasma at atmospheric pressure has been heated to approximately 18,000° C. for sustained periods of time, without incurring any damage to either the shield or the quartz enclosure.

In the illustrated embodiment of FIGS. 1 and 2, the upper limit on the plasma temperature that may be attained is determined by the diameter of the plasma arc formed in the cavity 22. As the power applied to the induction coil is increased, the diameter of the plasma arc in the cavity increases. If the arc is allowed to increase in size until it contacts the shield, the arc is quenched and damage may result to the shield. This characteristic performance is in contrast with that of the second embodiment, described further below, wherein the diameter of the plasma arc decreases as the power applied to the induction coil is increased.

The applicant believes that the improved performance of the induction plasma tube is attributable partially to the improved counterflow cooling system and partially to an electrical effect which is not yet fully understood. The latter effect is believed to arise from the use of relatively fewer but thicker shield segments, or tubes, than have been used in previously known plasma tube shields. It is thought that the use of relatively thick shield segments which are approximately equidimensional in cross-section may enhance the electromagnetic coupling between the induction coil and the argon gas contained in the cavity of the plasma tube. At the same time, however, the gaps between adjacent shield segments are nevertheless necessary to maintain electrical coupling between the coil and the plasma gas. Although an uninterrupted shield between the quartz enclosure and the plasma would be more desirable from the standpoint of protecting the enclosure, such a shield would also act as an electrical shield between the coil and the plasma gas, thereby reducing the electrical coupling. An acceptable compromise between the competing interests of protecting the quartz enclosure and maintaining electrical coupling between the coil and the plasma gas is obtained in a second embodiment of the invention, illustrated in FIGS. 3 and 4.

Figure 3:
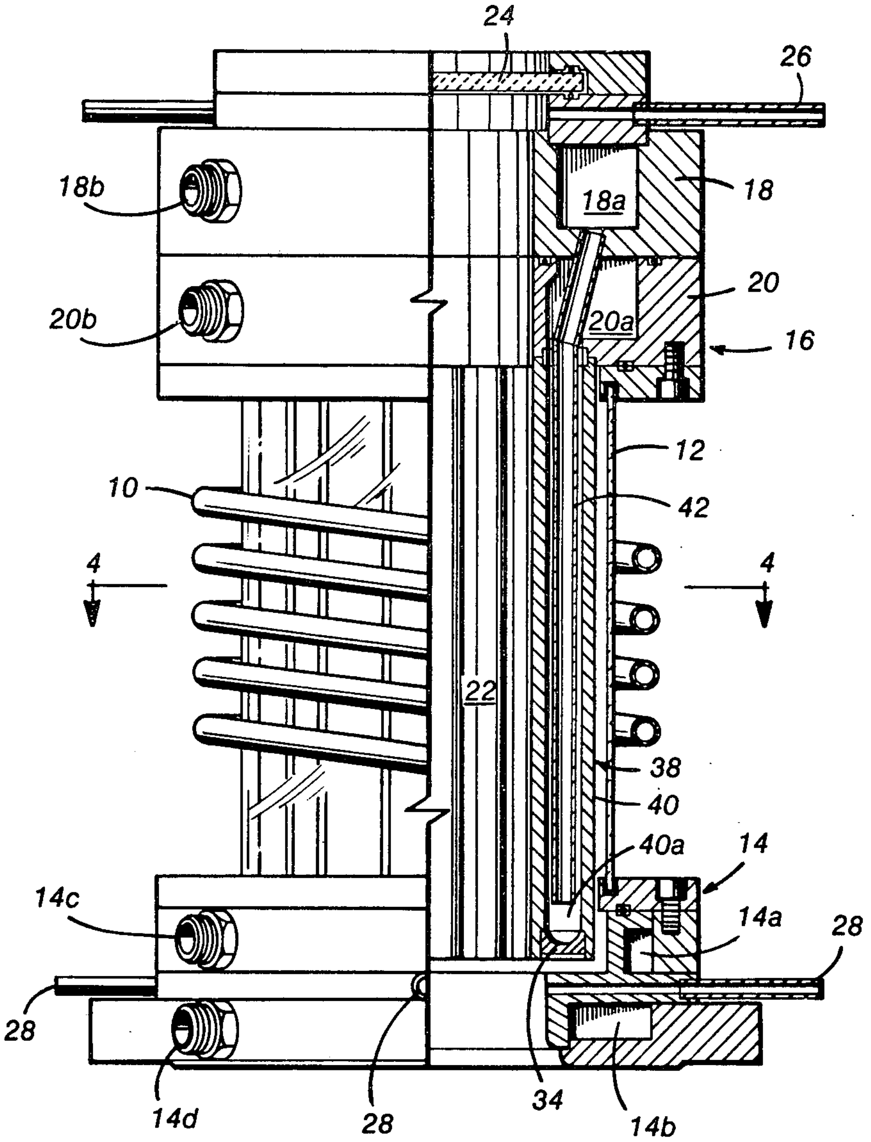
FIG. 3 is a side elevation view in partial cross-section of a second embodiment of the invention.
Figure 4:
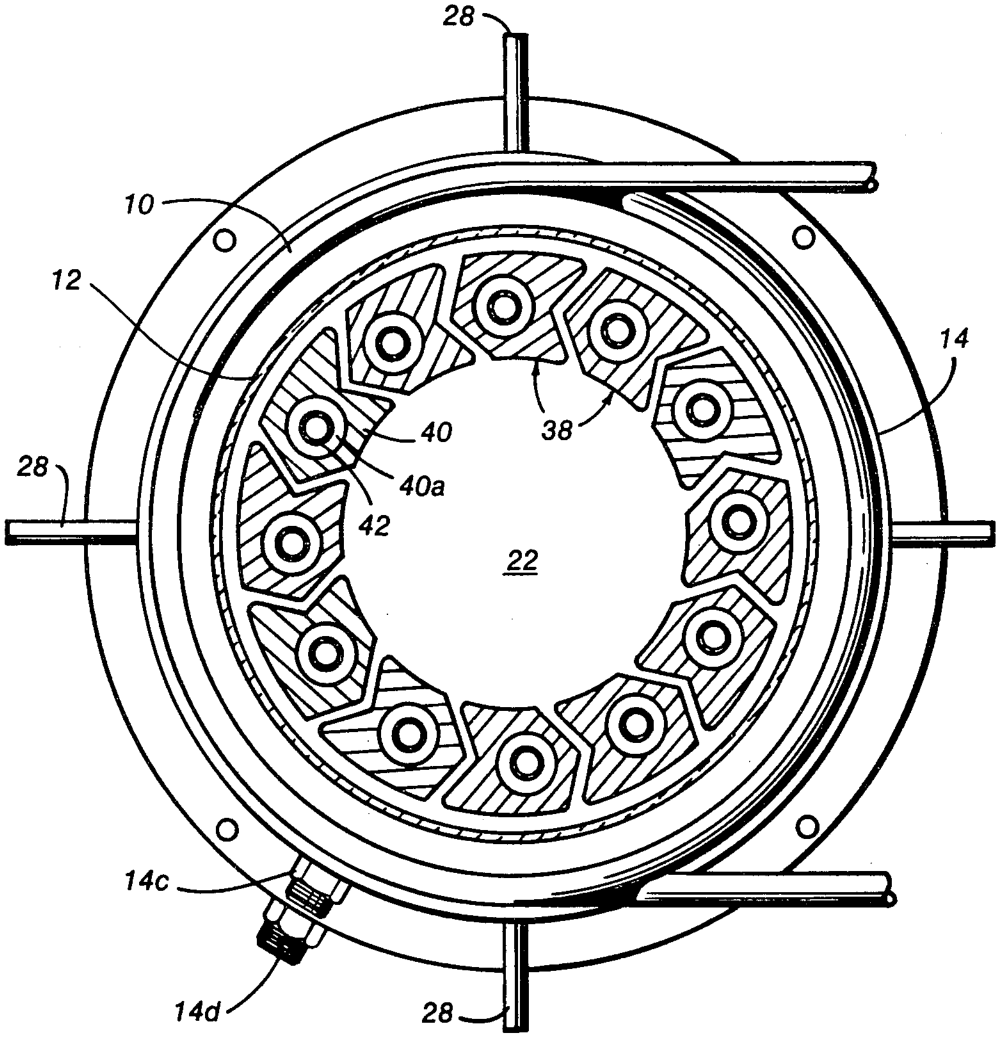
FIG. 4 is a plan view in cross-section of the embodiment of FIG. 3, taken along section line 4—4 of FIG. 3.

Referring to FIGS. 3 and 4, the second embodiment of the invention is generally similar to the first embodiment shown in FIGS. 1 and 2. Elements of the second embodiment which are the same as elements of the first embodiment are like-numbered. The essential difference between the embodiment of FIGS. 3 and 4 and the embodiment of FIGS. 1 and 2 lies in the cross-sectional shape of the shield segments. Referring to FIG. 4, the plasma shield 38 of the second embodiment consists essentially of twelve shield segments 40 which are chevron-shaped in cross-section. Each segment 40 includes a central bore 40*a* and a water supply tube 42 located therein. Each segment 40 of the shield is thus cooled by means of the counterflow cooling system described above. The chevron cross-sectional shape of the segments 40 results in a partially interlocking arrangement between adjacent segments, wherein the gaps between the segments 40 are angled. This results in shielding of the quartz enclosure 12 and the coil 10 from direct radiation from the plasma in the cavity 22. At the same time, however, the angled gaps are found to permit adequate electrical coupling between the induction coil and the plasma gas in the cavity 22. Thus, improved heat and radiation shielding is obtained without diminishing the electrical performance of the plasma tube. One unexpected result of this arrangement, however, is that the diameter of the plasma arc decreases as the power applied to the induction coil is increased. At some point, the diameter of the plasma arc becomes so small that the electromagnetic coupling between the plasma and the coil fails, and the arc extinguishes. Thus, the maximum power level that can be attained with this embodiment is subject to a different type of limitation than that which limits the temperature of the first embodiment. Sustained temperatures of approximately 15,000° C. have been attained routinely with the second embodiment shown in FIGS. 3 and 4.

The second embodiment has found particularly useful application in the formation of refractory microcrystalline powders. In this application, gaseous reagents are introduced into the cavity 22 through the intake tube 26. The reagents react in the plasma arc to form a refractory microcrystalline powder, which falls into a container located beneath the plasma tube cavity 22. The primary advantage of the second embodiment in carrying out this type of process is that at high power levels the plasma arc contracts in diameter so as to limit the reaction zone to a cylindrical region spaced inwardly from the shield segments 40. As a result, the shield segments are protected from chemical attack and the refractory powder is not contaminated with copper from the shield segments.

Figure 5:
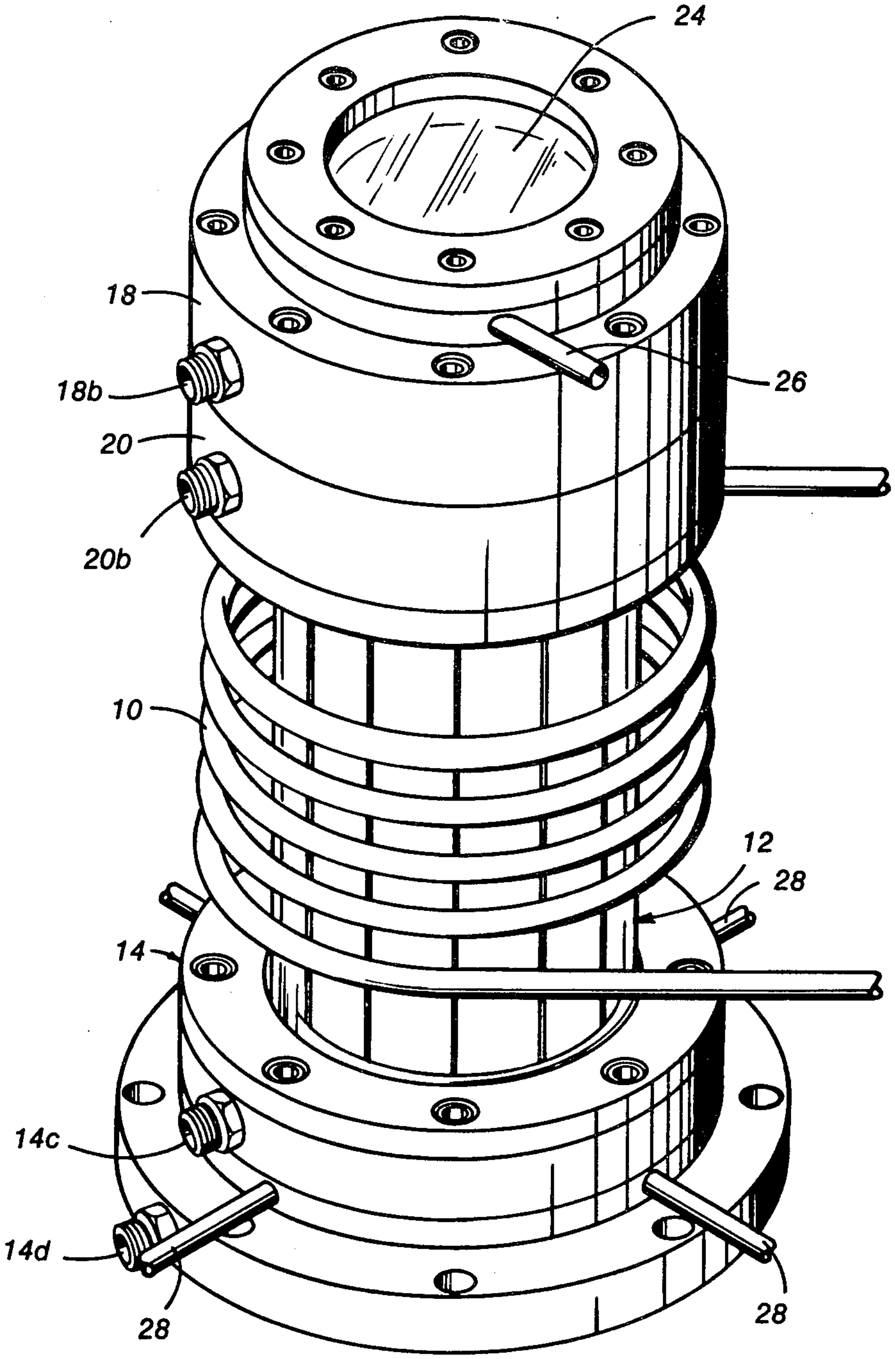
FIG. 5 is an isometric pictorial view of a third embodiment of the invention.
Figure 6:
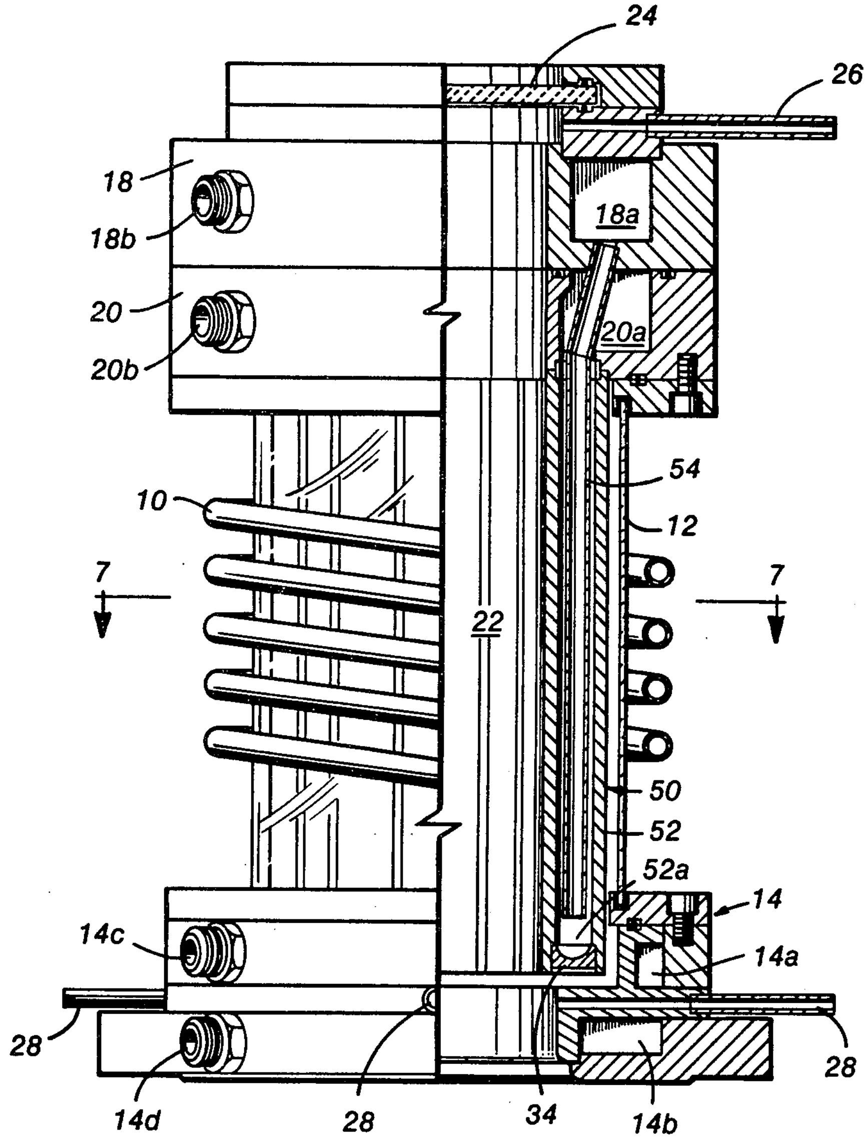
FIG 6. is a side elevation view in partial cross-section of the third embodiment shown in FIG. 5.
Figure 7:
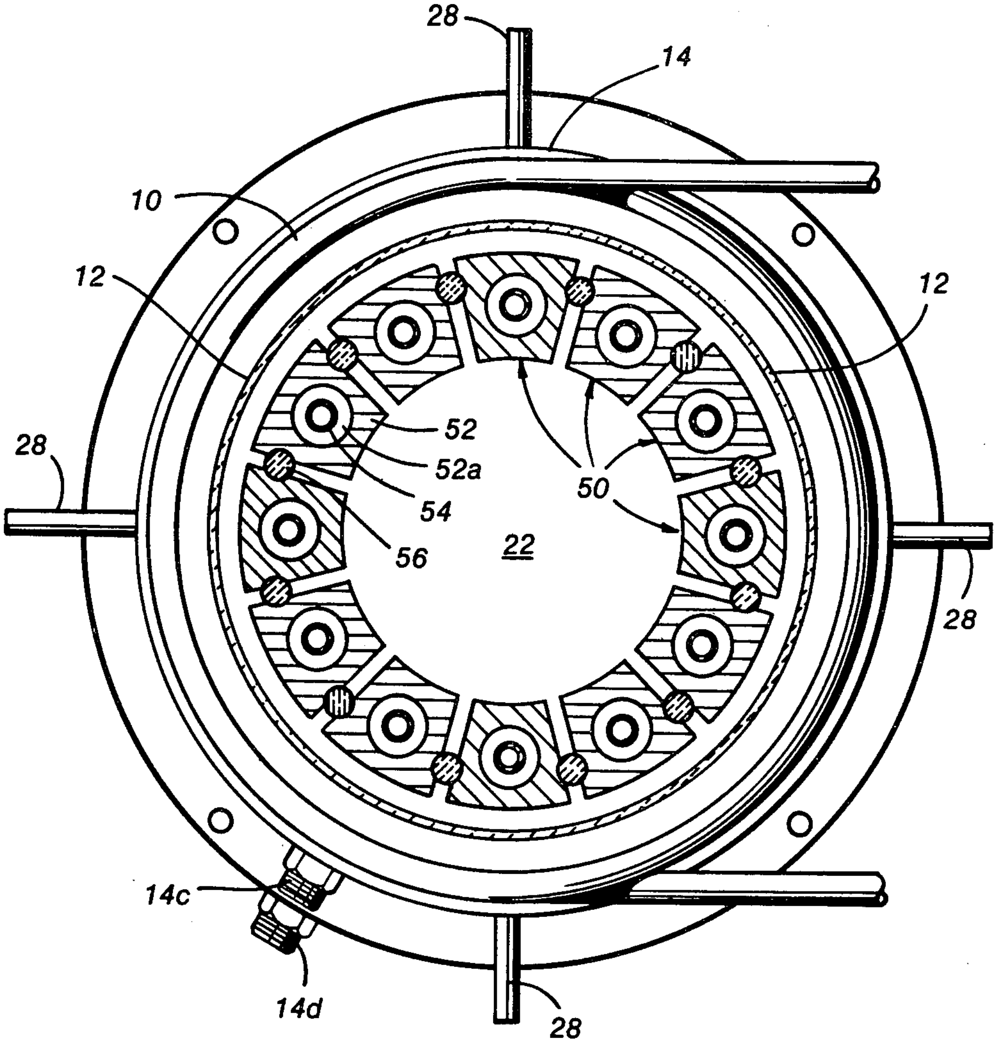
FIG. 7 is a plan view in cross-section of the third embodiment shown in FIG. 6, taken along section lines 7—7 of FIG. 6.

FIGS. 5 through 7 illustrate a third embodiment of the invention. As in the previous drawings, elements which are identical to elements of the previously described embodiments are like-numbered. The essential feature of the third embodiment is a segmented radiation shield 50 which consists of twelve wedge-shaped shield segments 52. Each segment 52 has a cross-sectional shape of a truncated wedge pointed toward the center of the cavity 22. The inner and outer surfaces of each segment 52 are cylindrically curved to give the shield a generally smooth cylindrical contour on both its inside and outside diameters.

Each shield segment 52 includes a central bore 52*a* and a water supply tube 54 therein to provide the counterflow cooling system described above. In this regard, the cooling system of the third embodiment is identical to the cooling systems of the embodiments described above.

Between each pair of adjacent shield segments 52 is a cylindrical rod 56 formed of a refractory dielectric material such as boron nitride. The rods 56 are set into opposing concave grooves formed in the sides of the shield segments 52. The rods 56 extend the full length of the segments 52.

The function of the refractory rods 56 is to occlude heat and radiation which would otherwise be emitted through the radial gaps between the shield segments 52 to impinge on the quartz enclosure 12 and the induction coil 10. Since the rods 56 are formed of a dielectric material, they do not interfere with the electrical coupling between the induction coil and the plasma gas. Thus, there is maintained an electrical coupling between the coil and the plasma while the quartz enclosure and the induction coil are also protected against heat and radiation. The boron nitride rods 56 are set into the concave grooves in the shield segments 52 in order to obtain efficient heat transfer between the rods 56 and the water-cooled segments 52.

Figure 8:
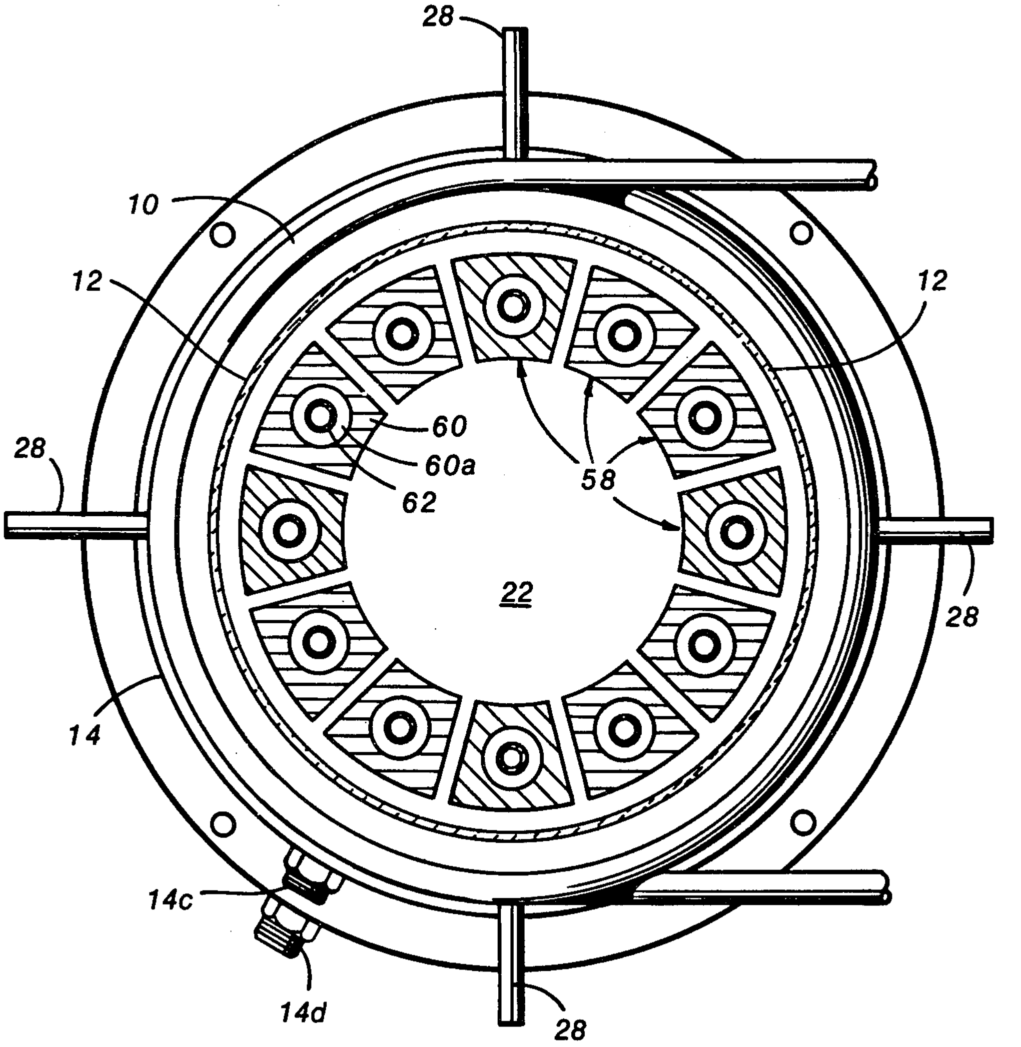
FIG. 8 is a plan view in cross-section of a fourth embodiment that is similar to the embodiment shown in FIGS. 5–7.

FIG. 8 shows a fourth embodiment that is essentially the same as the embodiment of FIGS. 5–7, except that it lacks the boron nitride rods 56. The embodiment of FIG. 8 includes a shield 58 consisting of simple wedge-shaped segments 60, each having a bore 60*a* and water supply tube 62. This embodiment has been demonstrated to attain a sustainable temperature of approximately 15,000° C. with an argon plasma at atmospheric pressure and a 400 kHz power supply. Even without the boron nitride shielding rods of the third embodiment, the shield of the fourth embodiment is sufficiently effective to permit the quartz enclosure to be touched manually immediately after the power is turned off. Also, it has been found that ordinary glass may be used to form the enclosure, rather than quartz, and yet permit attainment of plasma temperatures up to 15,000° C. It is believed that the efficiency of this design is at least partially due to the narrow, relatively long gaps between the adjacent shield segments 60, which significantly limit the amount of radiation that can be transmitted from the plasma through the shield, but which do not significantly impair the electrical coupling between the coil and the plasma.

The foregoing description of four embodiments of the invention has been presented for purposes of illustration and description. It is not intended to be exhaustive or to limit the invention to the precise forms disclosed, and various modifications, substitutions, and alterations are possible in view of the above teaching. The three embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An induction plasma tube comprising an electrical induction coil having a central longitudinal axis, a tubular enclosure centered coaxially on said axis and located inside said coil, and a segmented metal radiation shield centered coaxially on said axis inside said enclosure, said shield consisting of a plurality of elongate fluid-cooled metal shield segments extending parallel to said axis, said segments being disposed in a circular arrangement adjacent the interior surface of said enclosure and being substantially equally spaced apart circumferentially such that said shield has a generally tubular configuration, and said shield segments being shaped in cross-section so as to occlude line-of-sight transmission of light through said radiation shield.

2. The induction plasma tube defined in claim 1 wherein each of said shield segments includes a central longitudinal bore closed at one end, and a fluid supply tube extending into said bore from the opposite end and terminating adjacent the closed end of said bore, said supply tube being connected to a source of cooling fluid and said bore being connected to an exhaust for said cooling fluid, whereby each segment of the shield is independently cooled by a counterflow cooling system.

3. The induction plasma tube defined in claim 1 wherein each of said shield segments is chevron-shaped in cross-section, and wherein said segments are disposed in a partially interlocking arrangement so as to form an angled gap between each pair of segments which operates to shield the tubular enclosure and the induction coil from heat and radiation emitted by a plasma located within the shield.

4. The induction plasma tube defined in claim 1 wherein each shield segment has the cross-sectional shape of a truncated wedge pointed toward the center of the plasma tube, and wherein said shield further comprises a plurality of cylindrical rods of a refractory dielectric material interposed between each pair of shield segments to shield the coil and the tubular enclosure from heat and radiation emitted by a plasma contained within the shield.

5. The induction plasma tube defined in claim 4 wherein said refractory dielectric material is boron nitride.

* * * * *